United States Patent
Fenner

[15] 3,705,765
[45] Dec. 12, 1972

[54] APPARATUS FOR USE IN FOCUSSING IMAGES

[72] Inventor: David Fenton Fenner, Dunstable, England

[73] Assignee: National Research Development Corporation, London, England

[22] Filed: Jan. 23, 1970

[21] Appl. No.: 5,283

[30] Foreign Application Priority Data

Jan. 23, 1969  Great Britain............3,738/69

[52] U.S. Cl. ......................353/101, 95/44, 353/140
[51] Int. Cl. ..............................................G03b 3/00
[58] Field of Search ............353/101; 352/140; 95/44

[56] References Cited

UNITED STATES PATENTS

| | | |
|---|---|---|
| 3,364,815 | 1/1968 | Smith....................352/140 X |
| 3,560,647 | 2/1971 | Harmon..................352/140 |
| 3,562,785 | 2/1971 | Craig....................353/101 X |
| 3,037,423 | 6/1962 | Shurcliff...............353/101 X |

*Primary Examiner*—William D. Martin, Jr.
*Attorney*—Larson, Taylor & Hinds

[57] ABSTRACT

Apparatus for focussing images on screens in which a strip of the image is scanned by a radiation-sensitive device. The well-defined edges of a focussed image produce high-frequency components in the output of the radiation sensitive device which are absent when the image is out of focus. Scanning is produced by deflection coils of a television camera or by the pull-down mechanism of a projector which allows some radiation to reach the screen during pull-down. The focus may be determined in two planes, one in front of and the other behind the screen whereby an indication of the direction in which the lens should be moved to focus the image on the screen is given.

21 Claims, 7 Drawing Figures

APPARATUS FOR USE IN FOCUSSING IMAGES

The present invention relates to an apparatus for use in focusing images on screens, especially images formed by projection of cinematograph films.

According to the present invention apparatus for use in focusing images on screens including a radiation-sensitive device arranged to detect radiation in a plane where the sharpness of focus is to be determined and associated means for scanning with the radiation sensitive device a region of an image in the said plane, the radiation sensitive device providing a signal having an amplitude related to the intensity of illumination of the part of the region being scanned, and detector arranged to examine the signal for the presence of components having frequencies above a predetermined value.

The principle of operation of such apparatus is that when the image in sharply focused in the plane the aforementioned signal will include high frequency components which are absent when the image is out of focus.

In one form, the plane where the sharpness of focus is to be determined is the plane of the screen or an equivalent focal plane.

Alternatively the apparatus may include a second radiation-sensitive device, the first-mentioned and second radiation sensitive devices being arranged to detect radiation in planes respectively in front of and behind the screen or an equivalent focal plane, the means for scanning causing each radiation-sensitive device to scan a region of the image, the second radiation-sensitive device providing a signal having an amplitude related to the intensity of illumination of the part of the region being scanned and a second detector being arranged to examine the signal from the second radiation-sensitive device for the presence of components having frequencies above a predetermined value, such that the outputs of the detectors change in opposite senses on a change of focus relative to the screen.

It will be appreciated that it can be arranged that when the image is in focus, the outputs of the radiation-sensitive devices are equal or are in some other predetermined ratio.

The sense in which the lens must be adjusted when the image on the screen is out of focus to focus the image on the screen can be deduced from the outputs of the radiation-sensitive devices. If, for example the sharpness of focus at the position in front of the screen is greater than the sharpness of focus at the position behind the screen then the focal plane must lie nearer to the first position and therefore in front of the screen. In these circumstances the image must be moved away from the projector to focus the image on the screen.

Instead of having to deduce the adjustment required it can be arranged that the two outputs operate upon an indicator differentially to indicate the sense in which adjustment is required.

Furthermore the two outputs can be used in a servo control mechanism to control the optical system in such a manner as to focus the image upon the screen and to maintain it in focus.

Although the two radiation-sensitive devices themselves may be located at the two positions respectively in front of and behind the screen, in a preferred form the radiation-sensitive devices are so arranged behind two lenses respectively in or near the screen that when a real image is located at the position in front of the screen its image falls at one radiation-sensitive device and when a virtual image is located at the position behind the screen its image falls at the other radiation-sensitive device. Thus, by locating the lenses in holes in the screen and placing the radiation-sensitive devices behind the lenses and behind the screen, the need for a radiation-sensitive device in front of the screen is avoided.

Furthermore instead of locating or effectively locating the radiation-sensitive devices in front of and behind the screen they can be located or effectively located in front of and behind an equivalent plane associated with an auxiliary optical system.

The detector may include a high-pass filter through which only components of the signal with frequencies above the predetermined value pass, the presence of these components being detected by a signal-detecting device.

Alternatively the detector may include a further radiation sensitive device located in the same focal plane as the first-mentioned radiation-sensitive device and separated from it by a small distance, the means for scanning causing a region of the image to be so scanned by the two devices that each part of the region is scanned consecutively by the two radiation-sensitive devices, each of which provides a signal having an amplitude related to the intensity of illumination of the part of the region being scanned, a circuit being arranged so to combine the two signals that a third signal is provided only when the signals from the radiation-sensitive devices are varying in different ways at the same time.

The principle of operation of such apparatus is that when the image is in focus edges thereof will be scanned by the radiation-sensitive devices consecutively and thus their signals will be varying in different ways at any instant. A high frequency third signal will be present when the image is in focus. When the image is out of focus the edges are poorly defined. When such an edge is scanned by the radiation-sensitive devices, the intensity varies only slowly across the edge and the variations in signals will change more slowly. Thus, the signal given out by the radiation-sensitive devices will effectively be varying in the same way at any instant and there will be no third signal.

The said small distance by which the radiation-sensitive devices are separated can be empirically determined. If the devices are too close together the two signals from the devices will not differ sufficiently when the image is in focus. If the devices are too far apart the two signals will differ when the image is out of focus. In practice a suitable small distance may be found to be approximately one five-hundredth of the screen height.

In preferred embodiment of this form of detector the signals from the two radiation-sensitive devices are fed respectively to the bases of two collector-loaded transistors, the signals across the collector loads of the transistors being fed through two capacitors respectively to an output terminal to provide the third signal. The emitters of the transistors can share a common load, the signal across this load being fed through a capacitor to a second output terminal. The signal at this output terminal will contain high frequency components when the image is in focus because the sharply defined edges generate signals having short rise times.

In a first embodiment of the invention the radiation-sensitive device is a Vidicon or other camera tube and the means for scanning are deflection circuits therefor which are fed with an oscillating signal. Thus the output from the camera tube varies as the intensity of illumination varies along the scanned path. When the image is in focus the edges between the various picture components will be well defined and when scanned the edges will produce signals with short rise times. When the image is out of focus these edges will be diffuse, giving longer rise times. The signal from the camera tube, when the image is in focus, will therefore contain high frequency components that are absent when the image is out of focus, and an indication that these components are present, given by the signal-detecting device, also indicates that the image is in focus.

In a second embodiment, the pull-down mechanism of the projector is used as the means for scanning. The projector is provided with a means for reducing the intensity of the light falling on the screen during the pull-down of the film from one frame to the next, which at the same time allows some radiation, the presence of which can be detected by the radiation-sensitive device or devices to be transmitted through the film to the photo-sensitive device or devices. The or each device thereby scans a strip of the image of the film formed by the said radiation as the film is pulled down.

In a projector of the shutterless type the means for reducing the intensity of the light falling on the screen is the lamp assembly of the projector, which is adapted to reduce, but not extinguish, the lamp during pull-down.

In a projector of the type having a shutter, the shutter is a filter which allows some radiation to be transmitted through it while reducing the intensity of the transmitted light in the visible range. The filter can be a neutral density filter, a colored filter or a filter which is opaque to visible light but transmits some radiation outside the visible range.

Embodiments of the invention will now be described by way of example with reference to the accompanying drawings of which:

Figure 1:
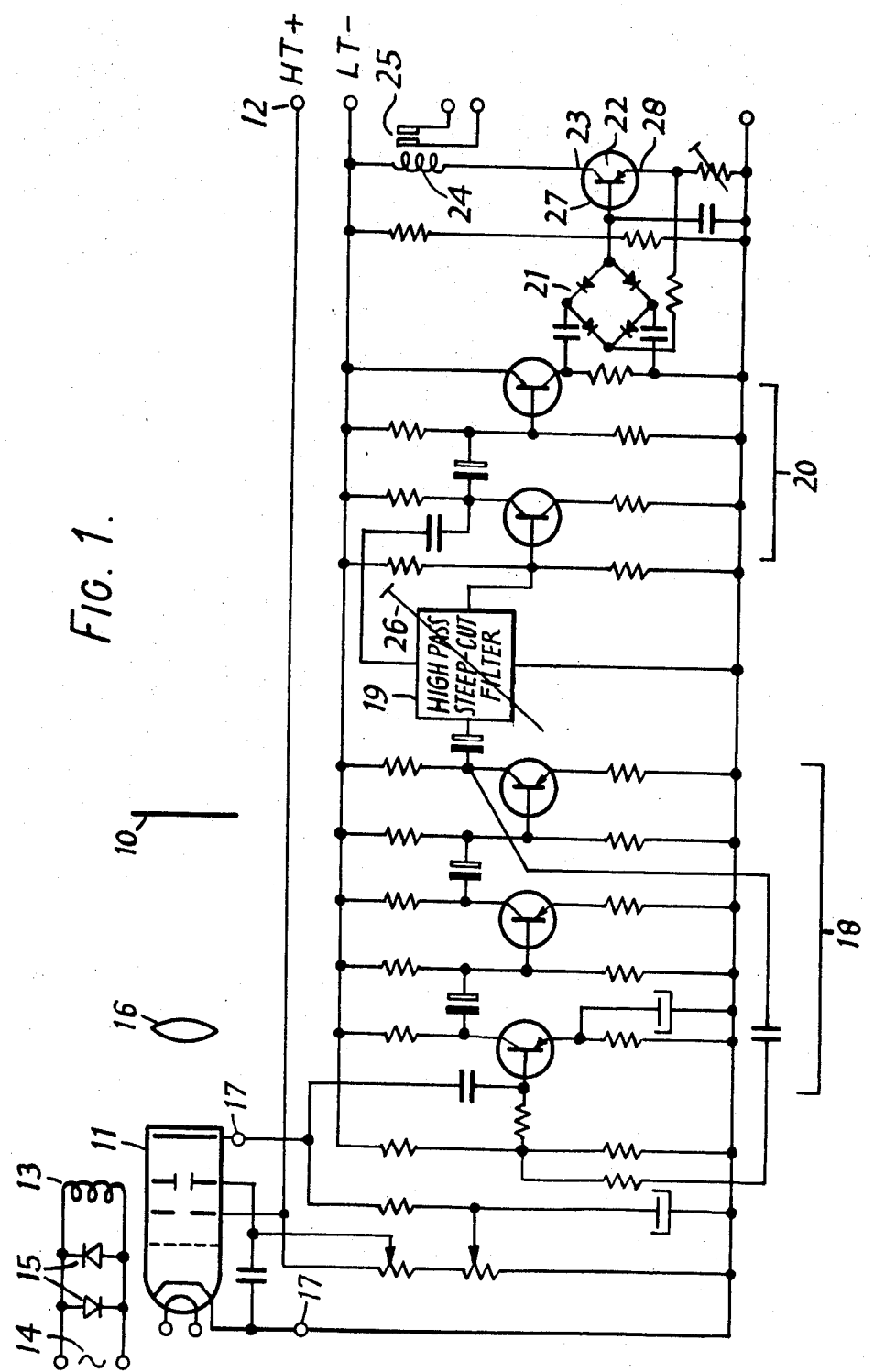
FIG. 1 shows a circuit diagram of an apparatus for indicating if the image on a screen is in focus.

Referring now to FIG. 1, a Vidicon tube 11 such as an EMI 10667 Vidicon, without time base generators, blanking pulse generator, or a radio-frequency oscillator is connected to an H.T. supply 12 in the normal way. The deflection coils 13 are connected to an alternating current supply 14 derived from the mains and furnished with diode clippers 15. The camera tube 11 is set up a few feet from the screen 10 at about half screen height and a third of the image width, the camera scanning a strip about four feet in length at the screen. The camera is focused on the screen 10 by means of a 25 mm lens 16.

The output terminals 17 of the Vidicon tube 11 are connected to the input of a three-transistor amplifier 18 and the output of the amplifier is connected to a negative feedback, variable high-pass filter 19. The output from the filter is connected to a two-transistor amplifier 20 and the output from this amplifier is connected to a full-wave bridge rectifier 21. The output of the rectifier is connected between the base 27 and emitter 28 of a p-n-p transistor 22. The collector 23 of the transistor 22 is loaded with a coil 24 which operates a relay 25.

The alternating current applied to the deflection coils 13 causes the Vidicon camera tube 11 to scan a strip of the screen 10 with a frequency of 100 cps. The signal from the output 17 of the camera tube is amplified by the three-transistor amplifier 18. The high-pass filter 19 allows only components of the signal with frequencies above a certain value, determined by the setting of the variable control 26, to pass to the two-transistor amplifier 20 for further amplification. A signal coming from the output of the two-transistor amplifier 20 is rectified and applied to the base 27 of the p-n-p transistor 22 which will conduct between collector 23 and emitter 28 if there is a sufficiently large signal applied to its base 27. When it conducts the coil 24 operates the relay 25. When there are no components with frequencies above the predetermined value no signal is applied to the base 27 of the p-n-p transistor 22 and it does not conduct. In this case there is no current through the coil 24 and the relay 25 remains un-operated.

When the image is in focus it will have well-defined edges which give high frequency signals when scanned. Setting the cut-off frequency of the filter 19 at a suitable value, for example 25,000 cps., these high frequency components will cause the relay 25 to be operated. When the image is out of focus it will have diffuse edges, there will be no high frequency component and the relay 25 will be un-operated. The relay 25 can be connected to a lamp (not shown) near the projector and arranged to light the lamp when the picture is in focus. Alternatively the relay 25 may be connected to a servo-mechanism (not shown) which will adjust the focus when the relay 25 is un-operated but hold the focus when the relay 25 is operated. The servo-mechanism can be arranged to hunt until the relay operates, since the circuit described above will not indicate in which sense the image is out of focus. Alternatively arrangements can be made to determine whether the servo-mechanism is operating in the correct direction and, if it is not, to reverse the operation of the servo-mechanism. Such arrangements can be based upon the principle that, as the focused condition is approached the camera tube signal will include progressively higher frequency components and vice versa. In another alternative the servo-mechanism is biased always to tend to de-focus the image in one sense and the signals from the relay are used to cause the mechanism to pull against this bias and hold a focused condition.

Figure 2:
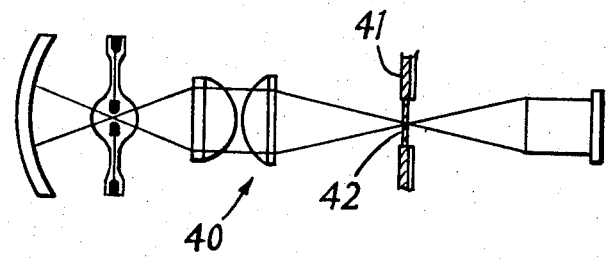
FIG. 2 shows the optical system of a projector for use in an alternative embodiment.
Figure 3:
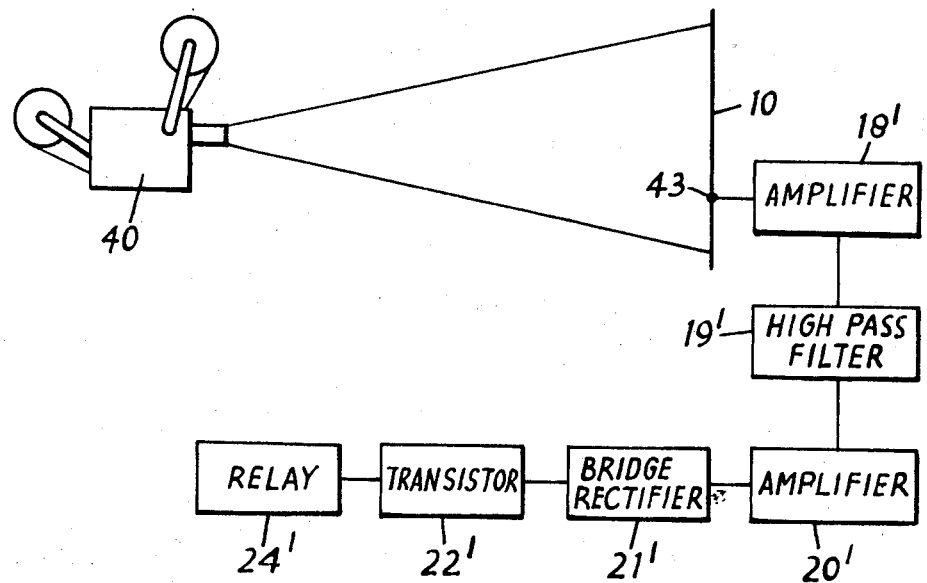
FIG. 3 shows a block diagram of the second embodiment.

Referring to FIGS. 2 and 3, in the second embodiment a film projector 40 comprises a lamp, a reflector a condenser a pull-down mechanism and a lens of conventional construction. The shutter of the projector has in one of its sectors a window 42 which is opaque to visible light but is transparent to infra-red radiation, such as the material sold under the name "Kodak Wratten" P.T.F.E. No. 88a. A photo-sensitive device 43 with a high sensitivity to infra-red radiation, such as a device sold under the name Mullard BPX25, is placed at, on or behind the screen 10, in a position where infra-red radiation from the projected image will fall upon it. The output of the photo-sensitive device is connected to the input of a three-transistor amplifier 18' which is connected in the manner described in the first embodiment of the invention to a high-pass filter 19', a two-transistor amplifier 20', a bridge rectifier 21', a transistor 22' and a relay 24'.

The photo-sensitive device will "see" the projected image in infra-red of the pull-down of the film between held frames and thus scans the image. High frequency components, absent when the image is out of focus, will be present in the signal given by the device when the image is in focus. These are fed to the three-transistor amplifier and detected in the manner described above. A very high frequency component may be present due to the resolution of the image of the grain of the film when the image is in focus.

The embodiment just described using an infra-red filter in the projector shutter can be modified in that the infra-red filter is replaced by a neutral density filter. The output of a photo-transistor placed at the screen is connected to a three transistor amplifier in the manner described.

The photo-transistor will "see" the projected image of the pull-down of the film between held frames in visible light of reduced intensity because of the filter. Thus the photo-transistor scans the image in visible light, but by reducing the intensity during pull-down a human observer does not see the pull-down and his viewing of the film is unimpaired. The signal from the photo-transistor is examined for high frequency components in the manner described.

Alternatively a shutterless projector may be used where, instead of the neutral density filter reducing the light during pull-down, the lamp is dimmed, but not extinguished, synchronously with the pulling down of the film.

Figure 4:
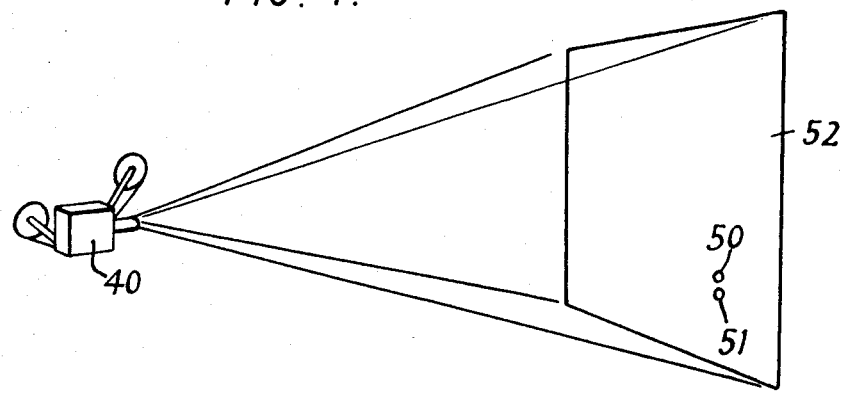
FIG. 4 shows an arrangement of radiation sensitive devices at the screen of a third embodiment.
Figure 5:
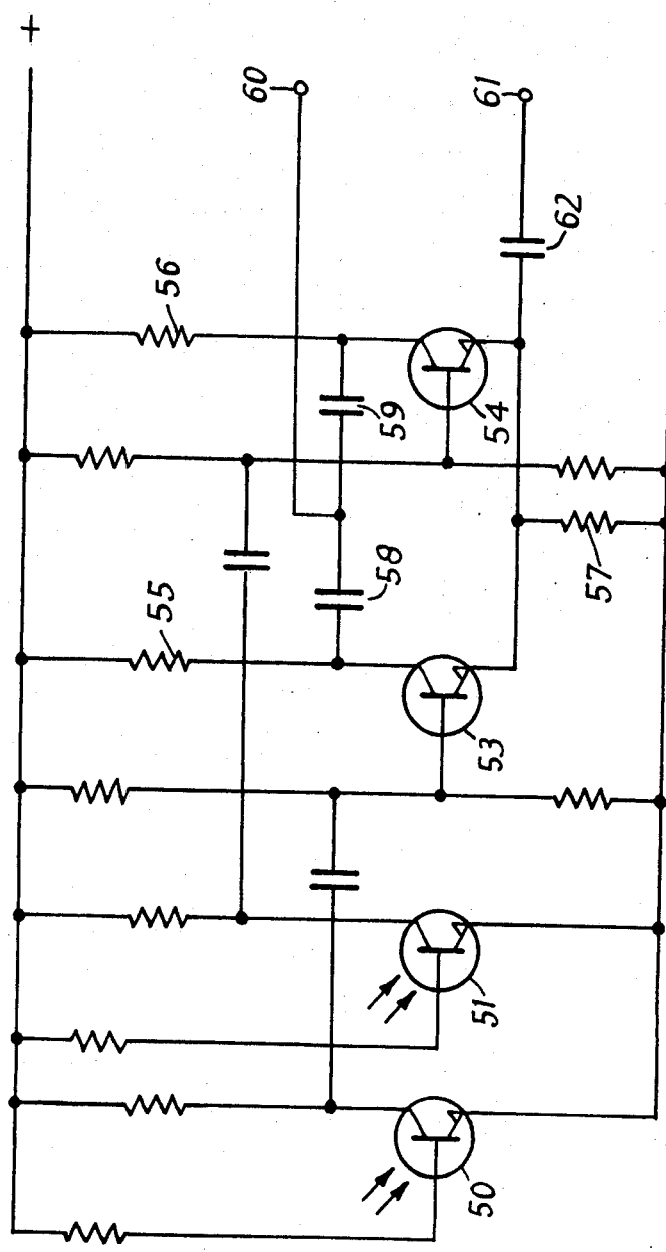
FIG. 5 shows a circuit diagram of the third embodiment.

In another embodiment of the present invention shown in FIGS. 4 and 5, two photo-transistors 50 and 51 are placed on the screen 52, one above the other, separated by a distance equal to the width of the blur of an edge between picture components when the image is in focus (approximately 1/500th screen height). The photo-transistors 50 and 51 are connected to a source of electrical potential and biased in the conventional manner. The photo-transistors are capacitor-coupled to two amplifying transistors 53 and 54 respectively which are also connected to the source of electrical potential. The amplifying transistors are collector loaded with respective resistors 55 and 56 and the emitter terminals of the two transistors are connected directly together and loaded with a single emitter-load resistor 57. The signal across the two collector-load resistor 55 and 56 are fed respectively through two capacitors 58 and 59 to a single first output 60. The signal across the emitter-load resistor 57 is fed to a second output 61 through a capacitor 62.

The pull-down mechanism of the projector 40 is used as the means for scanning as described hereinbefore. The presence of a signal at the first output can be detected by connecting the output to an amplifier which is tuned to accept only signals of a particular high frequency, then rectifying the output of the amplifier and using the output to operate a relay. The presence of components of the signal at the second output 61 above a predetermined value may be determined in the manner hereinbefore described.

When the image is in focus the signals from the two phototransistors 50 and 51, and hence the currents through the two amplying transistors 53 and 54, vary in the same way but there is a phase difference between them. When an edge between picture components is scanned consecutively by the two photo-transistors 50 and 51 and at any instant during the time while the edge is being scanned by either of the photo-transistors the intensity of the light falling on them will be varying in a different way. Consequently the potential differences across the collector loads of the amplifying transistors are varying in different ways and a signal appears at the first output 60 as charge flows between the two capacitors 58 and 59.

When the image is out of focus the edges of the picture components are poorly defined and the intensity of illumination varies slowly along the scanned strip. The variation in intensity is more constant and although there is a phase difference between the amplitudes of the signals from the respective photo-transistors, the variations in these signals is effectively the same at any instant. Thus, the potential differences across the collector loads are varying effectively in the same way at any instant, no charge flows between the capacitors and there is no signal present at the first output. The frequency of the signal when present will be approximately 90 Kcs and depends upon the speed of pull-down.

In this way a more definite indication of when the image is in focus can be obtained than by the other methods described. However this cannot be used to find the direction in which the projector lens should be moved to focus the image and therefore it is useful to use the signal from the second output to control a servo-mechanism which moves the projector lens to find the position of focus as described hereinbefore. The signal from the first output is then used to arrest the servo-mechanism once the correct position is found.

Figure 6:
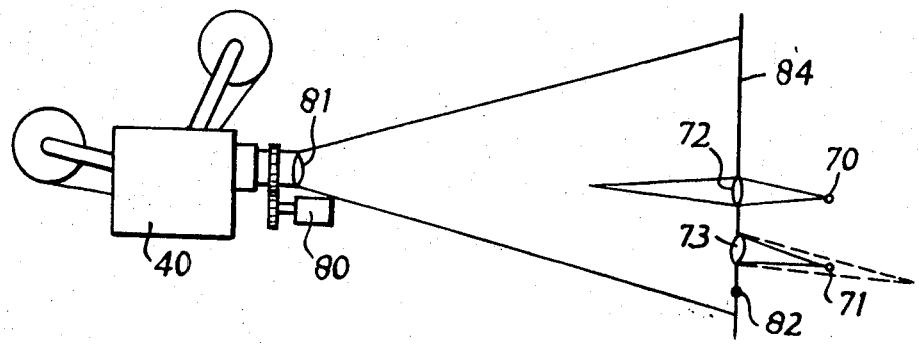
FIG. 6 shows an arrangement at the screen of a fourth embodiment of the invention.
Figure 7:
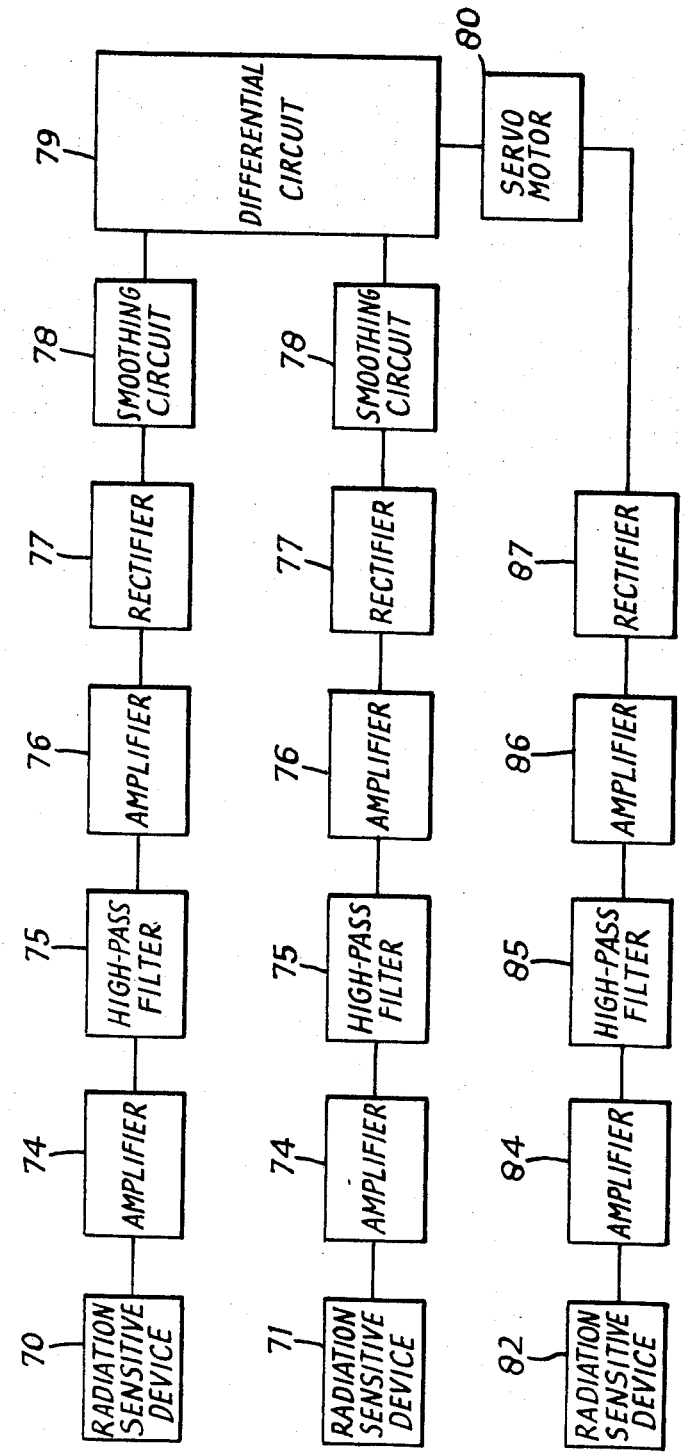
FIG. 7 shows a block diagram of the fourth embodiment.

A fourth embodiment of the invention is shown in FIGS. 6 and 7. Two photo-sensitive devices in the form of transistors 70 and 71 which are so connected to supply terminals as to be conducting and which are sensitive to infra-red radiation are located behind two lenses 72 and 73 in apertures near the edge of a cinema screen 84. The focal lengths of the lenses and the position of the transistors are so arranged that the transistors are at the image positions for the lenses of a real image and a virtual image at 10 feed in front of and 10 feet behind the screen respectively. Each transistor and its lens is aligned with the projector.

The outputs of the two transistors 70 and 71 are fed respectively to two amplifier 74 and the outputs of the two amplifiers 74 are fed respectively to two high-pass filters 75. The cut-off frequency of the filters is approximately 50 K/cps. The output of each filter 75 is amplified, by an amplifier 76 rectified by a rectifier 77 and smoothed by smoothing circuits 78. The outputs of the smoothing circuits 78 are connected to a differential circuit 79 of which the potential of one output terminal relative to another is positive or negative or zero depending upon departure from correct focus at which the potential is zero. This potential is used either directly to drive a motor 80 of a servo-mechanism of, indirectly, to control the operation of the motor. The servo-mechanism adjusts the lens 81 of the projector 40 in such a manner as to tend to maintain correct focus.

The shutter of the projector has a window of material which is opaque to visible light but transparent to infra-red radiation as shown in FIG. 2. During the pull-down of the film, the visible part of the radiation from the lamp of the projector is cut-out by the window of the shutter so as not to impair the audience's viewing of the film, but infra-red radiation is transmitted and some of this falls on the two transistors 70 and 71. The resistance of the transistors vary with the radiation falling on them. This causes variations in the currents passing through circuits which include the transistors. The amplitudes of the signals from the transistors 70 and 71 are proportional to the intensity of radiation falling on the transistors and therefore vary as the film is pulled down and the photosensitive transistors scan a strip of the image. The sharp edges of the image of a focused picture give rise to high frequency components in the signals. These components are not present in the signals when the image is out of focus. Thus the magnitude of the signals passing through the high-pass filters 75 give a measure of the focus of the images at positions 10 feet in front of and 10 feet behind the screen.

The signals from the filters are smoothed to remove fluctuations due to variations in image content. The signals applied to the differential circuit 79 are indicative of the focus in front of and behind the screen. To a rough approximation the focus of an image falls off symmetrically about the focal plane. Thus when the image is in focus the signals applied to the differential circuit will be approximately the same provided that the characteristics of the radiation-sensitive devices are the same. However if it is desired to correct for the asymmetry of the field of focus, the characteristics of the radiation-sensitive devices can be made so to differ that when the image is in focus at the screen the signals applied to the differential circuits are the same.

When the signals are different the focal plane lies on the side of the screen from which the greater signal comes. The sense of the potential difference from the differential circuit serves to indicate the sense in which the lens 81 of the projector 40 should be adjusted. The amplitude of the potential difference is indicative (for small deviations) of the deviation of the focal plane from the screen. It is therefore used to control the speed with which the servo mechanism 80 moves the lens, for when the deviation is large it is desirable that the lens be moved rapidly to find focus as quickly as possible, whereas when the deviation is small slow movement is desirable to avoid overshooting and hunting.

A third radiation-sensitive transistor 82 may be provided at the screen 84 and connected to through an amplifier 85 a high-pass filter 86 having a cut-off frequency of approximately 100 K/cps, which is higher than those for the other high-pass filters 75. The output of the high-pass filter is passed through a further amplifier 87 and a rectifier 88. Signals from this radiation-sensitive device 82 will only be present at the output of the rectifier 88 when the image is in focus at the screen 84 and this signal may be used to lock out the servo mechanism 80 when the screen image is focused. Some measure of inhibition of hunting can be provided in this way.

What is claimed is:

1. An apparatus for use in focusing images on screens comprising: a radiation-sensitive device arranged to detect radiation in a plane where the sharpness of an image is to be determined; means for scanning with said radiation-sensitive device a region of the image at said plane, said radiation-sensitive device providing a signal having an amplitude related to the intensity of illumination of the part of the region being scanned; detecting means for examining the signal for the presence of components having frequencies above a predetermined value; and a projector, the means for scanning being the pull-down mechanism of the projector, the projector having means for reducing the intensity of light falling on the screen during the pull-down of the film from one frame to the next which at the same time allows some radiation, the presence of which can be detected by the radiation-sensitive device, to be transmitted through the film to the radiation-sensitive device.

2. An apparatus as claimed in claim 1 wherein the radiation-sensitive means is located at a screen on which the image is formed for viewing by an audience.

3. An apparatus as claimed in claim 2 wherein the detector is connected to an indicating circuit whereby the detection of the presence of components having frequencies above the predetermined value causes an indication to be given by the indicating circuit.

4. An apparatus as claimed in claim 3 wherein the indicating apparatus includes a lamp which is lit when the said components are present in the signal.

5. An apparatus as claimed in claim 3 in which the projector has a lens, and includes a servo-mechanism for controlling the position of the lens and arranged to hunt until the detector detects the presence of the said components when the indicating circuit passes a signal to the servo-mechanism to cause it to stop hunting.

6. An apparatus as claimed in claim 1 and including a second radiation-sensitive device; a screen on which an image is formed for viewing by an audience, the first-mentioned and the second radiation-sensitive devices being arranged to detect radiation in planes respectively in front of and behind the screen, the means for scanning causing each radiation sensitive device to scan a region of the image, the second radiation-sensitive device providing a signal having an amplitude related to the intensity of illumination of the part of the region being scanned; and a second detecting means arranged to examine the signal from the second radiation -sensitive device for the presence of components having frequencies above a predetermined value whereby the outputs of the detecting means change in opposite senses on a change of focus relative to the screen.

7. An apparatus as claimed in claim 6 wherein the detectors provide equal outputs when the image is in focus at the screen.

8. An apparatus as claimed in claim 7 wherein the outputs of the detectors are applied differentially to an indicator to indicate the sense in which adjustment is required.

9. An apparatus as claimed in claim 7 wherein the outputs are connected to a servo control mechanism to control the optical system in such a manner as to focus the image on the screen and to maintain focus.

10. An apparatus as claimed in claim 6 wherein the radiation-sensitive devices are located behind two respective lenses in or near the screen or equivalent focal plane in an arrangement such that, when a real image is located in front of the screen or the equivalent focal plane, its image falls at one of the radiation-sensitive devices and, when a virtual image is located behind the screen or the equivalent focal plane, its image falls on the other radiation sensitive device.

11. An apparatus as claimed in claim 10 wherein the lenses are located in holes in the screen and the photosensitive devices are behind the screen.

12. An apparatus as claimed in claim 1 wherein the detector includes a high-pass filter.

13. An apparatus as claimed in claim 12 wherein the high-pass filter is manually variable to adjust the predetermined value.

14. An apparatus as claimed in claim 1 wherein the detector includes a further radiation-sensitive device located in the same focal plane as the first-mentioned radiation-sensitive device and separated from it by small distance, the means for scanning causing a region of the image to be so scanned that each part of the region is scanned consecutively by the two radiation-sensitive devices, each of which provides a signal having an amplitude related to the intensity of illumination of the part of the region scanned, and including a circuit arranged so to combine the two signals that a third signal is provided only when the signal from the radiation-sensitive devices are varying in different ways at the same time.

15. An apparatus as claimed in claim 4 wherein the circuit comprises two transistors having collector loads, the bases of the transistors being connected respectively to the two radiation-sensitive devices, the signals across the collector loads being fed through two capacitors respectively to a common output terminal which provides the third signal.

16. An apparatus as claimed in claim 15 wherein the transistors have a common emitter load, the signal across the emitter load being fed to a second output terminal.

17. An apparatus as claimed in claim 1 wherein the projector is of the shutterless type and the means for reducing the intensity of light falling on the screen is the lamp assembly of the projector, which is arranged to reduce the brightness of, but not extinguish, the lamp during pull-down.

18. An apparatus as claimed in claim 1 wherein the projector has a shutter including a filter which allows some radiation to be transmitted through it whilst reducing the intensity of the transmitted light in the visible range.

19. An apparatus as claimed in claim 18 wherein the filter is a neutral-density filter.

20. An apparatus as claimed in claim 18 wherein the filter is opaque to visible light but transmits some radiation outside the visible range.

21. An apparatus for use in focusing images on screens comprising: a radiation-sensitive device arranged to detect radiation in a plane where the sharpness of an image is to be determined; means for scanning with said radiation-sensitive device a region of the image at said plane, said radiation-sensitive device providing a signal having an amplitude related to the intensity of the illumination of the part of the region being scanned; and detecting means for examining the signal for the presence of components having frequencies above a predetermined value, said apparatus further comprising a second radiation-sensitive device; the first-mentioned and second radiation-sensitive devices being arranged to detect radiation in planes respectively in front of and behind a predetermined plane, the means for scanning causing each radiation-sensitive device to scan a region of the image, the second radiation-sensitive device providing a signal having an amplitude related to the intensity of illumination of the part of the region being scanned; and a second detecting means arranged to examine the signal from the second radiation-sensitive device for the presence of components having frequencies above a predetermined value whereby the outputs of the detecting means change in opposite senses on a change of focus relative to the predetermined plane.

* * * * *